United States Patent
Araki et al.

[11] Patent Number: 6,014,696
[45] Date of Patent: Jan. 11, 2000

[54] METHOD OF RESTRICTING DATA ACCESS TO WWW SERVER SO AS TO PERMIT SPECIFIC USER TO REFER TO SUCCESSIVE PAGES WHILE ENTRANCE PAGE IS FREELY ACQUIRED BY ANY USER

[75] Inventors: Hidenori Araki; Kiyoshi Kusumoto; Susumu Nomura; Yasuhiro Yamashita, all of Tokyo, Japan

[73] Assignee: Nippon Telegraph and Telephone Corporation, Japan

[21] Appl. No.: 09/056,368

[22] Filed: Apr. 7, 1998

[30] Foreign Application Priority Data

Apr. 7, 1997 [JP] Japan .................................. 9-088548
Dec. 24, 1997 [JP] Japan .................................. 9-355193

[51] Int. Cl.[7] .............................. G06F 13/00; G06F 17/30
[52] U.S. Cl. .............................. 709/219; 709/225; 707/10
[58] Field of Search .................................. 709/201, 202, 709/203, 217, 219, 224, 225, 300, 302; 707/9, 10, 100, 104, 501; 705/26, 27

[56] References Cited

U.S. PATENT DOCUMENTS

| | | | |
|---|---|---|---|
| 5,701,451 | 12/1997 | Rogers et al. | 707/1 |
| 5,710,887 | 1/1998 | Chelliah et al. | 705/26 |
| 5,754,939 | 5/1998 | Herz et al. | 455/4.2 |
| 5,889,958 | 3/1999 | Willens | 709/229 |

FOREIGN PATENT DOCUMENTS

| | | |
|---|---|---|
| 9-102944 | 4/1997 | Japan . |
| 9-153964 | 6/1997 | Japan . |
| WO 96/42041 A2 | 12/1996 | WIPO . |

*Primary Examiner*—Viet D. Vu
*Attorney, Agent, or Firm*—Pennie & Edmonds LLP

[57] ABSTRACT

A method for restricting a client or user to refer to data of a WWW server by using a WWW browser. In the present method, when the WWW browser demands to refer to a page-descriptive file and a relevant data file of the WWW server, an auxiliary program of the server side generates, for example, new files which respectively have the same substantial contents as the above two files while directory-file names of character sequences for specifying each of the new files are respectively different from those of the above files to be referred to, each new file name including a character sequence specific to the user unit, so as to permit only a user unit (such as a client or a user of the client) to refer to the data. The WWW browser of the user side refers to the files of different names.

21 Claims, 15 Drawing Sheets

METHOD OF RESTRICTING DATA ACCESS TO WWW SERVER SO AS TO PERMIT SPECIFIC USER TO REFER TO SUCCESSIVE PAGES WHILE ENTRANCE PAGE IS FREELY ACQUIRED BY ANY USER

BACKGROUND OF THE INVENTION

1. Field of the Invention

The present invention relates to a client-server system composed of plural computers which are connected to a communication network, and more specifically, relates to a method and to a medium for storing programs implementing the method, for restricting client or user access to data stored in a WWW (World Wide Web) server using a WWW browser in a wide area computer network. This application is based on Patent Applications Nos. Hei 9-88548 and Hei 9-355193 filed in Japan, the contents of which are incorporated herein by reference.

2. Description of the Related Art

Conventionally, data of a WWW server connected to a wide area computer network such as the Internet can be obtained by and displayed for all users (via a WWW browser) who know a descriptive format for specifying an objective page-descriptive file.

In another conventional system, a descriptive file for a page and a relevant data file can be output via an auxiliary program of the server when a password is input. However, in such a system, it has been impossible to restrict a specific client or user to obtain data to be displayed, and to successively perform such a restriction of data reference over plural pages by page-turning operations.

On the other hand, payment of information charges relating to obtained data of a WWW server (as mentioned above) in a wide area computer network requires some troublesome procedures such as purchasing a prepaid card, registering as a member, and transferring funds, or sending a credit-card number via the wide area computer network.

SUMMARY OF THE INVENTION

An object of the present invention is to provide a method of restricting data reference in a client-server system composed of plural computers connected to a communication network such as a wide area computer network, wherein only a specified client or user (who uses the "client" computer) can obtain data of a WWW server and look up the displayed data by using a WWW browser while the entrance page for acquiring the following data is freely acquired by any client or user.

Another object of the present invention is to perform restriction of data reference so as to apply a toll collecting function of a telephone network to collection of charges for obtaining data provided from a WWW server, and to realize data selling in which data provision of the server side and payment of the client side can be completed within a telephone network and a wide area computer network.

A further object of the present invention is to provide a storage medium storing a computer-executable program for restricting reference of data of the WWW server in such a client-server system.

Therefore, the present invention provides a method of restricting a predetermined user unit to refer to data stored in a WWW server using a WWW browser in a client-server system connected to a wide area computer network, wherein:

when the WWW browser at the client side demands to refer to a page-descriptive file and a relevant data file of a predetermined page of the server side, the server side generates new files which respectively have the same substantial contents as the above two files while directory-file names of character sequences for specifying each of the new files are respectively different from those of the above files to be referred to, each new file name including a character sequence specific to the user unit, and the server side informs the client side of the character sequence specific to the user unit; and, when the WWW browser sends the server side a request for acquiring the page-descriptive file and relevant data file using the character sequence specific to the user unit, the server side sends the WWW browser the page-descriptive file and relevant data file which have been revised in content by which the WWW browser refers to the files having different names.

In the above method, the following processes may be preferable: when the WWW browser sends the server side a request for acquiring a page-descriptive file and a relevant data file of a page different from the predetermined page, the server sides converts a description necessary for page-turning to the requested page to a description using the character sequence specific to the user unit and a page name of the requested page, and sends the page-descriptive file and relevant data file including the converted content from the WWW server to the WWW browser, by which reference restriction using the character sequence specific to the user unit is performed over plural pages.

The present invention also provides a method which similarly restricts a predetermined user unit to refer to data stored in a WWW server using a WWW browser, wherein:

when the WWW browser at the client side demands to refer to a page-descriptive file and a relevant data file of a predetermined page of the server side, the server side generates a directory-file name specific to the user unit and registers data of a conversion pair of the directory-file name specific to the user unit and an original directory-file name relating to corresponding original files of the system, and informs the client side the directory-file name specific to the user unit;

when the WWW browser sends the server side a request for acquiring the page-descriptive file and relevant data file using the directory-file name specific to the user unit, the server side refers to the conversion pair and converts the directory-file name specific to the user unit to the original directory-file name, and informs the WWW server at the server side of the converted name, the WWW server reads out the page-descriptive file and relevant data file according to the original directory-file name; and the server side reconverts the original directory-file name to the directory-file name specific to the user unit, and sends the WWW browser the read-out page-descriptive file and relevant data file.

In the above-mentioned methods, the user unit is, for example, a client or a user who accesses the computer network via the client.

According to the above methods, when data of the WWW server connected to the wide area computer network are acquired and displayed using the WWW browser, it is possible to permit a specific client or user to refer to data of a page or plural successive pages, and to forbid other clients or users from referring to the relevant data.

The server side may monitor a data reference time or reference times of the user unit, and if the reference time or times exceed a predetermined time or number, the server side may delete the files having the different names specific to the user unit or delete the data of the conversion pair of the directory-file name with respect to the original name, by which the user unit cannot refer to data hereafter.

The present invention further provides a method of restricting data reference in a similar client-server system so as to collect charges, which are predetermined for each data provided from a WWW server, with telephone tolls, wherein:

an information-providing server informs a client, which has connected to the wide area computer network via a predetermined telephone line, of a list of possible data provided by the WWW server at the information-providing server side;

when the client side selects desired data from the communicated data list and informs the information-providing server side of the selected data, the information-providing server side informs the client side of a telephone number which has been assigned for the relevant data and is used for substitutingly performing information-charge collection;

the client side then disconnects the predetermined telephone line and sends a call using the telephone number received from the information-providing server side and establishes a dial-up connection with an access control server to which the client can be connected using the above telephone number, and client side informs the access control server of a name of the desired data; and when the access control server confirms that the client side has established connection using the telephone number assigned for the relevant data, the control server informs the information-providing server of agreement to data reference, by which the information-providing server sends the client side the relevant data.

According to this method, line-connecting conditions of the client are detected by the access control server; thus, it is possible to bill the user of the client for a telephone toll including relevant data-reference charges. Therefore, troublesome procedures such as purchasing a prepaid card, registering as a member, or sending a credit-card number via the wide area computer network are unnecessary. That is, it is possible to realize a data-selling system executed in a wide area computer network.

If a wireless telephone is used, it is possible to obtain effects such as realizing a higher communication speed than that obtained in a wire connection using a modem, and using a portable communication terminal.

The present invention also provides the following four kinds of computer-readable and executable storage media.

(1) Storage medium storing a processing program of the server side, comprising the processes of:

generating new files when the WWW browser at the client side demands to refer to a page-descriptive file and a relevant data file of a predetermined page of the server side, the new files respectively having the same substantial contents as the above two files while directory-file names of character sequences for specifying each of the new files being respectively different from those of the above files to be referred to, each new file name including a character sequence specific to the user unit; and informing the client side of the character sequence specific to the user unit; and sending the WWW browser the page-descriptive file and relevant data file which have been revised in content by which the WWW browser refers to the files having different names when receiving a request for acquiring the page-descriptive file and relevant data file using the character sequence specific to the user unit from the WWW browser.

(2) Storage medium storing a processing program of the server side, comprising the processes of:

generating a directory-file name specific to the user unit when the WWW browser at the client side demands to refer to a page-descriptive file and a relevant data file of a predetermined page of the server side; registering data of a conversion pair of the directory-file name specific to the user unit and an original directory-file name relating to corresponding original files of the system; and informing the client side of the directory-file name specific to the user unit; and referring to the conversion pair when receiving a request for acquiring the page-descriptive file and relevant data file using the directory-file name specific to the user unit; converting the directory-file name specific to the user unit to the original directory-file name; and informing the WWW server at the server side of the converted name; and reconverting the original directory-file name to the directory-file name specific to the user unit, and sending the WWW browser the page-descriptive file and relevant data file read-out by the WWW server.

(3) Storage medium storing a processing program of the information-providing server side, comprising the processes of:

informing a client, which has connected to the wide area computer network via a predetermined telephone line, of a list of possible data provided by the WWW server in the present information-providing server;

informing the client side, when receiving information of desired data from the client side, of a telephone number which has been assigned for the relevant data and is used for substitutingly performing information-charge collection; and sending the client side the relevant data when receiving information indicating agreement to data reference from an access control server to which the client side can connect by using the above telephone number.

(4) Storage medium storing a processing program of the access control server side, comprising the processes of:

receiving a name of desired data for reference from the client side via a dial-up connection; confirming that the client side has established the connection using a telephone number assigned for the relevant data; and informing an information-providing server, which can provide the relevant data, of agreement to data reference.

DESCRIPTION OF THE PREFERRED EMBODIMENTS

Figure 1:
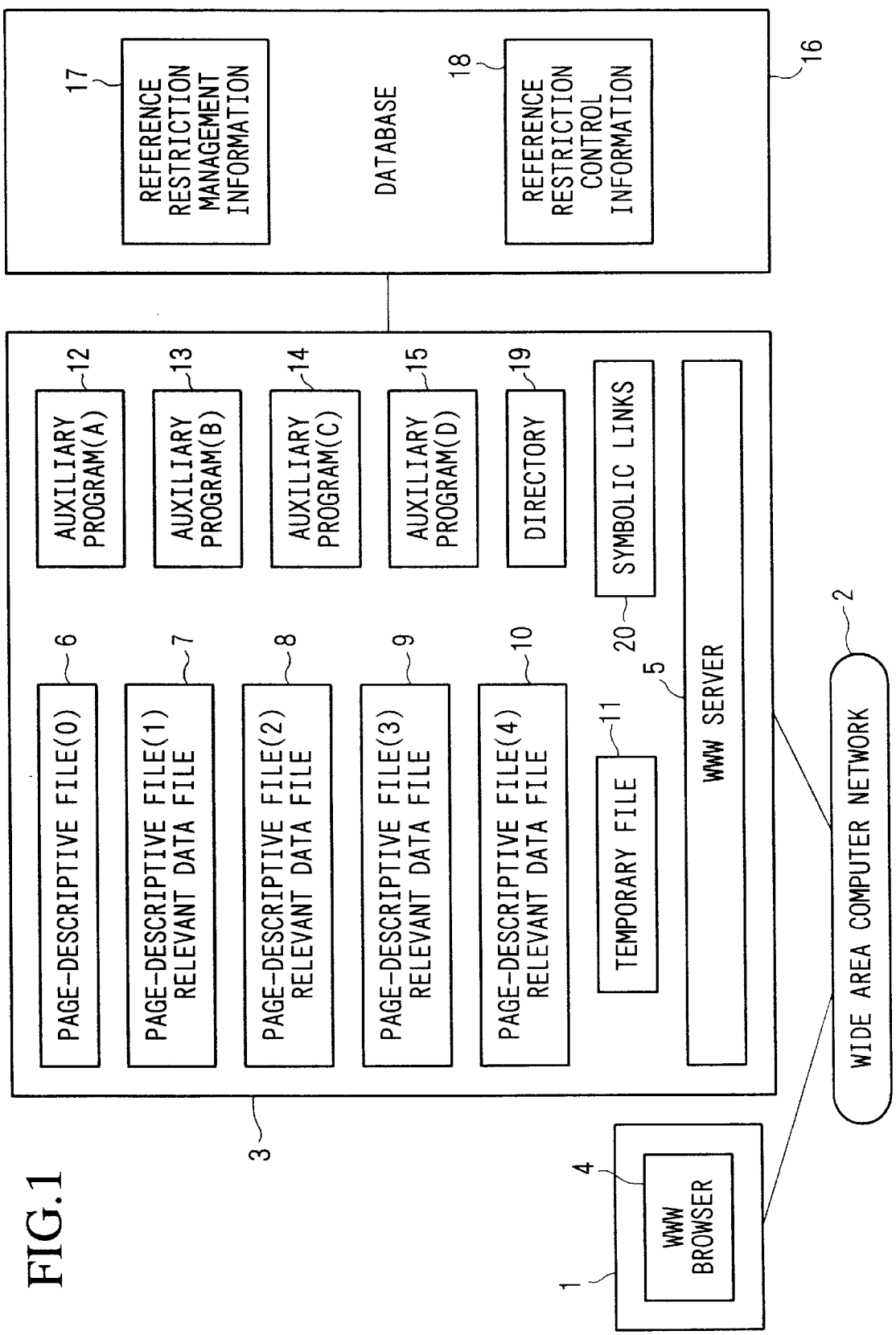
FIG. 1 is a diagram showing construction of a client-server system as the first embodiment of the present invention.

Hereinbelow, preferred embodiments of the present invention will be explained with reference to the drawings.
First Embodiment FIG. 1 is a diagram showing construction of a client-server system as the first embodiment of the present invention.

This client-server system is composed of client 1, wide area computer network 2, and server 3. This server 3 comprises database 16 while client 1 comprises WWW browser 4.

The server 3 comprises WWW server 5; page-descriptive file(0) 6; (a set of) page-descriptive file(1) and relevant data file 7; page-descriptive file(2) and relevant data file 8; page-descriptive file(3) and relevant data file 9; page-descriptive file(4) and relevant data file 10; temporary file 11; auxiliary program (file)(A) 12; auxiliary program (file)(B) 13; auxiliary program (file)(C) 14; and auxiliary program (file)(D) 15.

In database 16, reference restriction management information 17 is stored for each client or user who receives a service with reference restriction. Additionally, reference restriction control information 18 is previously stored, in which data relating to a possible reference time (for an access) or possible access times are previously stored for determining the reference restriction management information 17.

The page-descriptive file(0) 6 is used for confirming whether or not pages under reference restriction are going to be obtained.

Here, a set of reference-restricted files is from page-descriptive file(1) and relevant data file 7 to page-descriptive file(4) and relevant data file 10.

In temporary file 11, a list of symbolic links is stored, which themselves have no substantial content but only indicate the substance of any of these files 7–10.

Functions of auxiliary program(A) 12 are to generate a character sequence (or a password, a random number, etc.) specific to a client or a user, to register reference restriction management information 17 in database 16, and to process page-descriptive file(0) 6.

Auxiliary program(B) 13 is used to process page-descriptive file(1) and relevant data file 7 relating to the first restricted page, while auxiliary program(C) 14 is used to process page-descriptive file(2) and relevant data file 8 to page-descriptive file(4) and relevant data file 10 relating to the following restricted pages from the second page.

Functions of auxiliary program(D) 15 are to search reference restriction management information 17 in database 16 and to perform a process for terminating reference of a client or a user whose access time or access times exceed a predetermined value or number.

Figure 2:
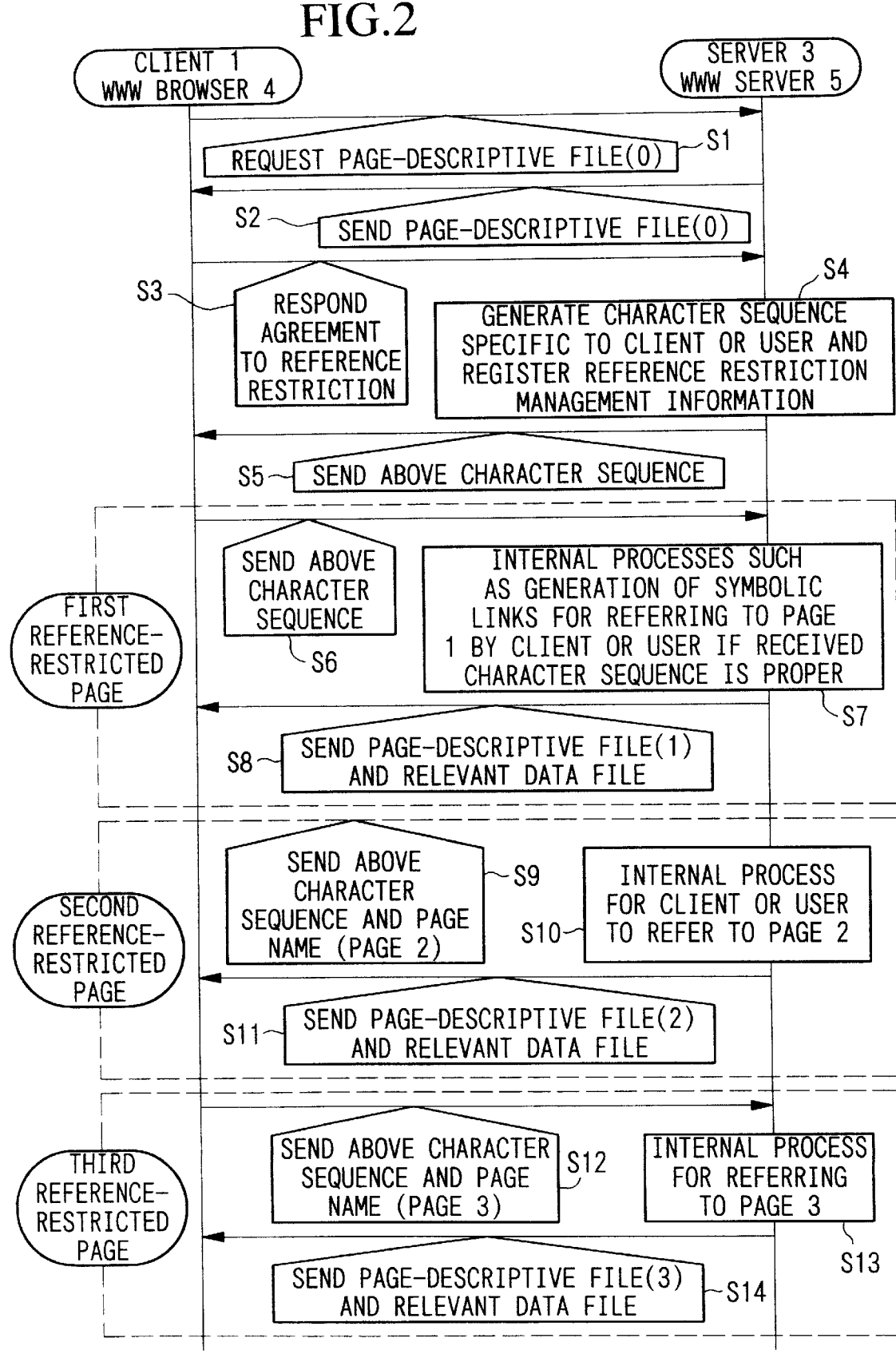
FIG. 2 shows a general processing sequence of the client-server system of FIG. 1.

FIG. 2 shows a general processing sequence of the client-server system of FIG. 1, and general operations of the system will be explained with reference to FIG. 2.

First, a user of client 1 makes connection to WWW server 5 in server 3 via wide area computer network 2 by using WWW browser 4, and acquires page-descriptive file(0) 6, by which the relevant page is displayed (see steps S1 and S2). In the page-descriptive file(0) 6, (data of) a confirmation button is prepared, which is used for inputting user's decision whether he or she will receive a service for obtaining pages under reference restriction. Thus, the user returns a response indicating agreement to the reference restriction to server 3, by clicking the confirmation button on displayed page "0" (see step S3).

When a response of agreement to the reference restriction is sent from client 1, auxiliary program(A) 12 in server 3 is started. Auxiliary program(A) 12 generates a character sequence (or a password, a random number, etc.) specific to a client or a user, and registers reference restriction management information 17 consisting of the above character sequence, reference restriction start time, and reference restriction finish time (or reference restriction management information consisting of the character sequence and possible reference times) in database 16 (see step S4). The program(A) then sends client 1 the character sequence (or a password, a random number, etc.) specific to the client or user (see step S5).

When a user of client 1 sends server 3 a page-acquirement request using the character sequence (or a password, a random number, etc.) specific to the client or user, which was sent from the server and obtained by the client (see step S6), auxiliary program(B) 13 is started and the character sequence specific to the client or user is transferred to the auxiliary program(B) 13 as a parameter.

The auxiliary program(B) 13 confirms the character sequence specific to the client or user transferred as the parameter, and if the character sequence is confirmed to be proper, the program(B) generates directory 19 having a directory name including the character sequence specific to the client or user. The program(B) further generates temporary file 11 and (data of) symbolic links 20 indicating substantial contents of page-descriptive file(1) and relevant data file 7 (to be referred to) in the generated directory, and stores a list of the generated symbolic links 20 into temporary file 11 (see step S7). The auxiliary program(B) then sends page-descriptive file(1) and relevant data file 7 (i.e., the first page), which was rewritten to refer to the above symbolic links 20, to WWW browser 4 via WWW server 5 (see step S8).

On the other hand, if the character sequence specific to the client or user is improper, auxiliary program(B) 13 informs the WWW browser 4 of the confirmed result, and terminates the processing.

When the user of client 1 performs a page-turning operation on the displayed page 1, the character sequence specific to the client or user and a name of the next requested page (here, page 2) are transferred to auxiliary program(C) 14 as parameters (see step S9). The auxiliary program(C) 14 is accordingly started.

The auxiliary program(C) 14 acquires temporary file 11 of a directory-file name including the specific character sequence, and reads out the list of symbolic links 20 from the temporary file 11, which indicate substantial contents of page-descriptive file(1) and relevant data file 7 relating to the present page before turning (i.e., page 1). The program (C) then deletes the symbolic links, and generates symbolic links 20 indicating substantial contents of page-descriptive file(2) and relevant data file 8, to be newly referred to, in directory 19. The program(C) further stores the list of generated symbolic links 20 into temporary file 11 and sends WWW browser 4 page-descriptive file(2) and relevant data file 8 (i.e., the second page), which was rewritten to refer to these symbolic links, via WWW server 5 (see step S11). Operations for jumping to page 3 or 4 are similarly performed (see steps S12, S13, and S14).

On the other hand, auxiliary program(D) 15 of server 3 periodically searches reference restriction management information 17 registered in database 16, and if data exceeding a predetermined reference time or times is found, the program(D) 15 deletes the symbolic links 20 (stored in directory 19 of the name including the character sequence specific to the client or user), temporary file 11, and the above directory 19. After this operation, the user of client 1, who was provided the character sequence specific to the client or user, cannot refer to a page under restriction.

Figure 3:
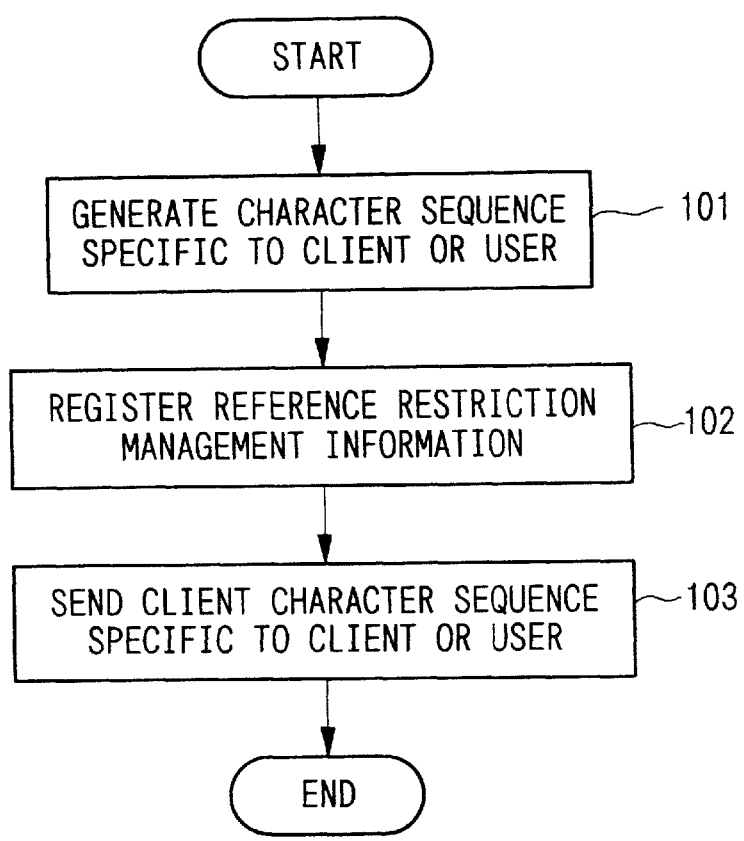
FIG. 3 is a flowchart of auxiliary program(A) shown in FIG. 1.

FIG. 3 shows a flowchart of auxiliary program(A) 12. This program is started when, for example, a user of client 1 clicks a confirmation button on a displayed screen of page-descriptive file(0) (i.e., page 0).

The auxiliary program(A) 12 first generates a character sequence (or a password, a random number, etc.) specific to a client or a user (see step 101). The program(A) then generates reference restriction management information 17 using the specific character sequence as an ID, the information consisting of reference restriction start and finish times or possible reference times, and newly registers this information in database 16 (see step 102). After that, auxiliary program(A) 12 sends client 1 the generated character sequence specific to the client or user, and terminates the processing (see step 103).

Figure 4:
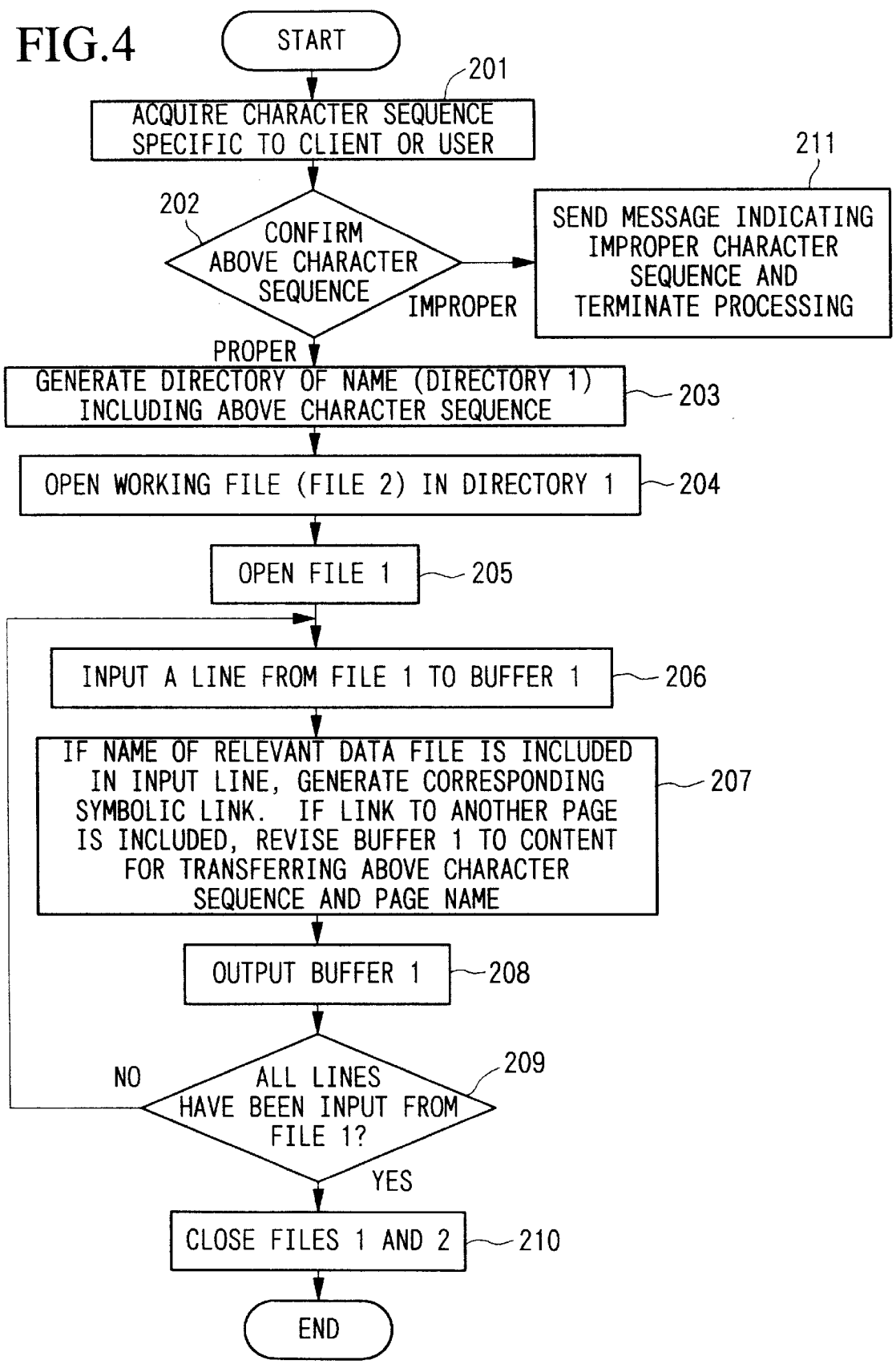
FIG. 4 is a flowchart of auxiliary program(B) shown in FIG. 1.

FIG. 4 shows a flowchart of auxiliary program(B) 13. This auxiliary program(B) 13 is started when client 1 sends the server a page-acquirement request using the character sequence specific to the client or user. This program(B) performs confirmation of the user, and necessary processes with respect to the page-descriptive file and relevant data file of a first page for reference restriction (i.e., (a set of) files 7 in this embodiment). Here, the file name (including a pass name) of first page-descriptive file(1) for reference restriction is defined as "file 1", while a relevant working area in the memory of the server computer is assumed as "buffer 1".

The auxiliary program(B) 13 acquires the character sequence specific to the client or user, which was transferred as a parameter when this program is started (see step 201). The program(B) 13 then confirms this character sequence (see step 202), and if the character sequence is improper, sends the WWW browser of client 1 a message communicating the confirmed result and terminates the processing (see step 211). If the character sequence is proper, the following operations are performed by this program(B).

First, a directory whose name includes the character sequence specific to the client or user is generated. This directory is defined as "directory 1" here (see step 203).

Next, a working file is opened in this directory 1. This working file is defined as "file 2" (see step 204). This file 2 is provided for storing a directory-file name specific to the client or user when relevant symbolic links are deleted. Here, "directory 1/file 2" corresponds to temporary file 11 in FIG. 1. After these operations, file 1 (i.e., the first page-descriptive file for user restriction) is opened (see step 205).

Next, a line of file 1 is read out and input into buffer 1 (see step 206). If a name of a relevant data file for displaying a page is included in the input line, symbolic link 20 indicating the substantial content of the data file is generated in directory 1 and the content of buffer 1 is revised to a content for referring to the generated symbolic links (only the "pass" is changed and the file name is unchanged). The determined file name (including the character sequence specific to the client or user) is then stored into file 2.

If the input line includes a link to another page, the content of buffer 1 is revised to a content for transferring the character sequence (specific to the client or user) and the page name to auxiliary program(B) 13 as parameters. In this case, operations of generating symbolic links in directory 1 and of storing the file name are similar to those in the case in which a name of a relevant data file has been stored.

After these operations, the contents of buffer 1 are sent to the client (see step 208).

The above steps 206–208 are repeated, and if all lines of file 1 have already been input (see step 209), files 1 and 2 are closed and the processing is terminated (see step 210).

Figure 5:
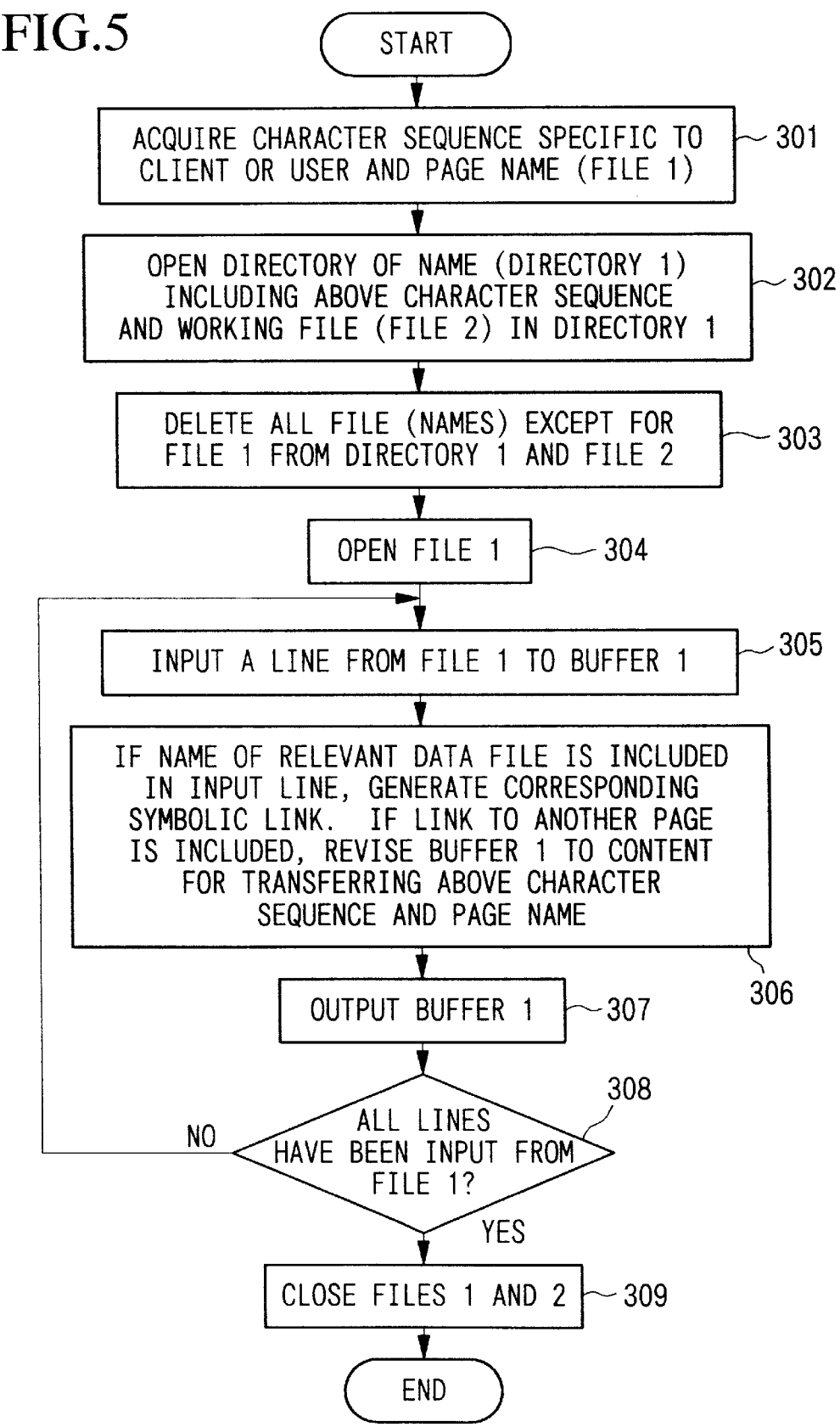
FIG. 5 is a flowchart of auxiliary program(C) shown in FIG. 1.

FIG. 5 shows a flowchart of auxiliary program(C) 14. The auxiliary program(C) 14 is started every time a user of client 1 performs a page-turning operation, and performs necessary processes with respect to sets of a page-descriptive file and a relevant data file (file sets 8–10 in this embodiment) of pages from the second page for reference restriction. Here, the name of the page-descriptive file for reference restriction is again defined as "file 1", while a working area in the memory of the server computer is defined as "buffer 1".

The auxiliary program(C) 14 acquires the character sequence specific to the client or user, which was transferred as a parameter when this program is started (see step 301). Next, the program(B) opens the directory of the name including the character sequence (transferred as a parameter) specific to the client or user (i.e., directory 1), and the working file generated in the directory 1 (i.e., file 2) (see step 302).

That is, program(C) 14 opens temporary file 11 having a directory/file name having the character sequence specific to the client or user. The program(C) then deletes all files (i.e., symbolic links 20) except for the file of the page name corresponding to the transferred parameter (i.e., file 1) among files stored in directory 1, and further deletes all file names except for file 1 registered in file 2 (see step 303).

After that, program(C) opens file 1 (the next page-descriptive file for reference restriction) (see step 304).

Next, each line of file 1 is read out and input into buffer 1 (see step 305), and operations of steps 306–307 are repeated. The operations of steps 306–307 are basically the same as steps 207–208 in FIG. 4. The only differece is that if the input line includes a link to another page, the content of buffer 1 is revised to a content for transferring the character sequence (specific to the client or user) and the page name to the program(C) 14 as parameters.

The above steps 305–307 are repeated, and if all lines of file 1 have already been input (see step 308), files 1 and 2 are closed and the processing is terminated (see step 309).

Figure 6:
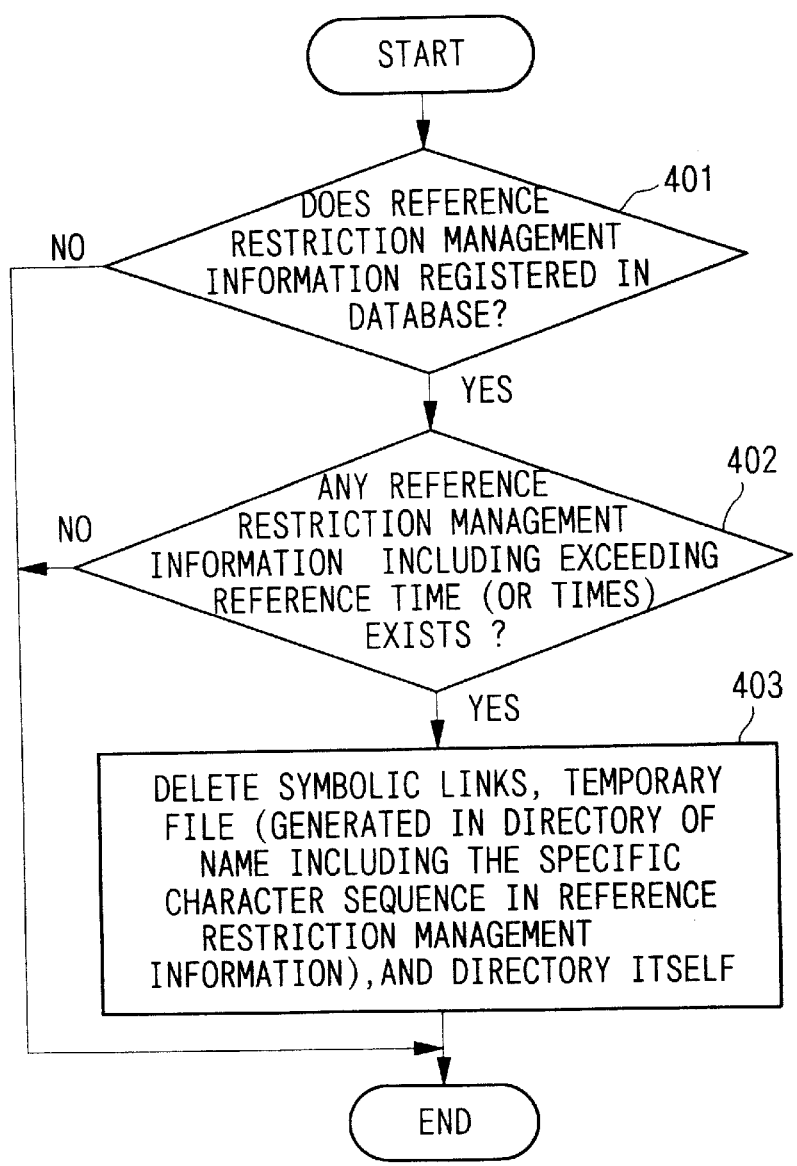
FIG. 6 is a flowchart of auxiliary program(D) shown in FIG. 1.

FIG. 6 shows a flowchart of auxiliary program(D) 15. The character of auxiliary program(D) 15 differs from other auxiliary programs (A)12–(C)14, and this program(D) is started, for example, periodically.

When the auxiliary program(D)15 is started, the program searches database 16 for any registered reference restriction management information (see step 401). If no management information has been registered, the program(D) terminates the processing of this time. If any registered management information is found, the program(D) then checks whether any reference restriction management information in which the present reference time or times exceed a predetermined value or number exists (see step 402). If such exceeding data is not found, the program(D) terminates the processing.

Here, the judgment whether the reference time exceeds a predetermined time is determined, for example, by comparing the present time with a reference finish time registered in the reference restriction management information. On the other hand, the judgment whether the reference times exceed a predetermined number is determined, for example, by initially setting possible reference times (n) in the reference restriction management information and subtracting "1" from (the number of) reference times for each reference, and checking whether the reference times reaches "0".

If any reference restriction management information having exceeding reference time (or reference times) is found in step 402, temporary file 11 (directory 1) is searched using the character sequence specific to the client or user (in the reference restriction management information) as a key, and symbolic links 20 and temporary file 11, generated in the directory of a name having the character sequence, and the directory 19 itself, are deleted (see step 403).

Hereinbelow, a specific example of the present embodiment will be shown with reference to lists.

Original data of the contents (of files 7–10 in FIG. 1) are assumed as in list 1.

LIST 1

| | |
|---|---|
| /html/page1.html | (descriptive file of page 1) |
| /html/picture1a.gif | (relevant data file of page 1) |
| /html/picture1b.gif | (relevant data file of page 1) |
| /html/page2.html | (descriptive file of page 2) |
| /html/picture2a.gif | (relevant data file of page 2) |
| /html/picture2b.gif | (relevant data file of page 2) |
| /html/page3.html | (descriptive file of page 3) |
| /html/picture3a.gif | (relevant data file of page 3) |
| /html/picture3b.gif | (relevant data file of page 3) |
| /html/page4.html | (descriptive file of page 4) |

The following list 2 shows the content of "page1.html" while list 3 shows the content of "page2.html".

LIST 2

```
<HTML>
<HEAD>page 1</HEAD>
<BODY>
<IMG SRC="http://www.a.co.jp/html/picture1a.gif">
<IMG SRC="http://www.a.co.jp/html/picture1b.gif">
<A HREF="http://www.a.co.jp/html/page2.html">next page</A>
</BODY>
</HTML>
```

LIST 3

```
<HTML>
<HEAD>page 2<HEAD>
<BODY>
<IMG SRC="http://www.a.co.jp/html/picture2a.gif">
<IMG SRC="http://www.a.co.jp/html/picture2b.gif">
<A HREF="http://www.a.co.jp/html/picture3.html">next page</A>
</BODY>
</HTML>
```

Here, the domain name of the WWW server, an identifier for specifying the WWW server in a wide area computer network, is assumed to be "www.a.cojp".

The following list 4 shows an example of reference restriction control information 18, in which it is determined that "10 minutes" are assigned as a possible reference time for files registered in directory "html".

LIST 4

| <Name of directory where files for reference restriction exist> | <Possible reference time> |
|---|---|
| html | 10 |

Here, the character sequence specific to the client or user is assumed as "12345678", and the name of the page-descriptive file for reference restriction is assumed to be, for example, "/html/page1.html" for page 1. Regarding pages 2–4, similar assuming rules are adopted. It is also assumed that directory 1 (temporary file 11) is generated with the name "12345678".

The "/html/page1.html" shown in list 2 is converted as shown in the following list 5 by auxiliary program(B) 13, and the converted data are output.

LIST 5

```
<HTML>
<HEAD>page 1</HEAD>
<BODY>
<IMG SRC="http://www.a.co.jp/12345678/picture1a.gif">
```

LIST 5

```
<IMG SRC="http://www.a.co.jp/12345678/picture1b.gif">
<A HREF="http://www.a.co.jp/cgi-bin/ap2?12345678&page2.html">next page</A>
</BODY>
</HTML>
```

In list 5, "ap2" indicates auxiliary program(C) 14, and "12345678" means data transferred to "ap2" as a character sequence specific to a client or a user, while "page2.html" means data transferred to "ap2" as a page name. In the directory of temporary file 11 (that is, directory 1), symbolic links of the following list 6 is generated, and file names included in the following list 7 are input into the working file (i.e., file 2).

LIST 6

| | |
|---|---|
| /12345678/picture1a.gif | (Substantial content is "/html/picture1a.gif") |
| /12345678/picture1b.gif | (Substantial content is "/html/picture1b.gif") |

-continued

| | |
|---|---|
| /12345678/page2.html | (Substantial content is "/html/page2.html") |

LIST 7

/12345678/picture1a.gif
/12345678/picture1b.gif
/12345678/page2.html

As "10 minutes" have been defined as the possible reference time limit in the above list 4, if temporal reference restriction is preferably performed, data in the following list 8 are registered as reference restriction management information 17.

LIST 8

| <Specific character sequence> | <Reference restriction start time> | <Reference restriction finish time> |
|---|---|---|
| 12345678 | 1998/02/19 20:31:43 | 1998/02/19 20:41:43 |

The auxiliary program(D) 15 in server 3 periodically compares the registered reference restriction finish time and the present time. If the present time exceeds the reference restriction finish time, the symbolic links (having names described in temporary files (refer to list 7) in directory "/12345678"), the temporary file, and directory "/12345678" are deleted in turn.

File 2 is provided for storing a directory-file name specific to the client or user when relevant symbolic links are deleted, as explained above. The lists 5 to 7 can be obtained by repeatedly performing steps 206–208 in FIG. 4.

When the button "next page" is clicked via the WWW browser at the client side, auxiliary program(C) 14 is started and symbolic links "/12345678/picture1a.gif" and "/12345678/picture1b.gif" in list 6 are deleted. The contents of list 3 are then converted to those shown in the following list 9 and are output.

LIST 9

```
<HTML>
<HEAD>page 2</HEAD>
<BODY>
<IMG SRC="http://www.a.co.jp/12345678/picture2a.gif">
<IMG SRC="http://www.a.co.jp/12345678/picture2b.gif">
<A HREF="http://www.a.co.jp/cgi-bin/ap2?12345678&pagea3.html">next page</A>
</BODY>
</HTML>
```

As symbolic links, those shown in the following list 10 are generated and the contents of the following list 11 are stored into file 2.

LIST 10

| | |
|---|---|
| /12345678/page2.html | (Substantial content is "/html/page2.html") |
| /12345678/picture2a.gif | (Substantial content is "/html/picture2a.gif") |
| /12345678/picture2b.gif | (Substantial content is "/html/picture2b.gif") |
| /12345678/page3.html | (Substantial content is "/html/page3.html") |

LIST 11

/12345678/page2.html
/12345678/picture2a.gif
/12345678/picture2b.gif
/12345678/page3.html When the button "next page" is again clicked using the WWW browser at the client side, symbolic links "/12345678/picture2a.gif" and "/12345678/picture2b.gif" in list 10 are deleted. Additionally, HTML (data) as shown in the following list 12 is output and symbolic links as shown in the following list 13 are generated (these data are linked to the original files).

LIST 12

```
<HTML>
<HEAD>page 3</HEAD>
<BODY>
```

-continued

```
<IMG SRC="http://www.a.co.jp/12345678/picture3a.gif">
<IMG SRC="http://www.a.co.jp/12345678/picture3b.gif">
<A HREF="http://www.a.co.jp/cgi-bin/ap2?12345678&pagea4.html">next page</A>
</BODY>
</HTML>
```

LIST 13

| | |
|---|---|
| /12345678/page3.html | (Substantial content is "/html/page3.html") |
| /12345678/picture3a.gif | (Substantial content is "/html/picture3a.gif") |
| /12345678/picture3b.gif | (Substantial content is "/html/picture3b.gif") |
| /12345678/page4.html | (Substantial content is "/html/page4.html") |

The contents of the temporary file are revised as the following list 14.

LIST 14

Figure 7:
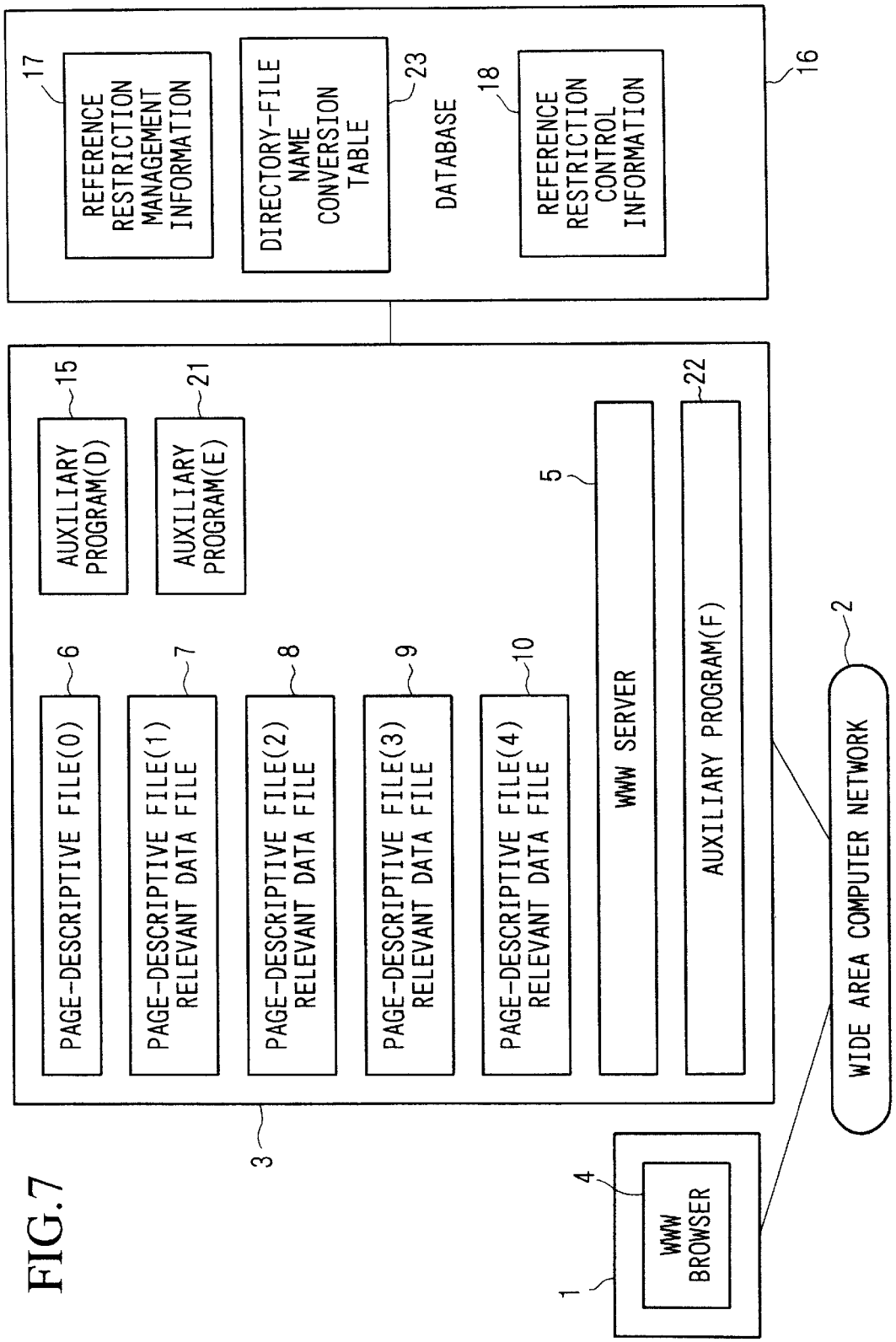
FIG. 7 is a diagram showing construction of a client-server system as the second embodiment of the present invention.

/12345678/page3.html
/12345678/picture3a.gif
/12345678/picture3b.gif
/12345678/page4.html Second Embodiment FIG. 7 is a diagram showing construction of a client-server system as the second embodiment of the present invention.

This client-server system is composed of client 1, wide area computer network 2, and server 3. The server 3 comprises database 16, while client 1 comprises WWW browser 4.

The server 3 comprises WWW server 5; page-descriptive file(0) 6 which includes (data of) a confirmation button for page-reference restriction; page-descriptive file(1) and relevant data file 7 to page-descriptive file (4) and relevant data file 10 as objects for reference restriction; auxiliary program (file)(D) 15; auxiliary program (file)(E) 21; and auxiliary program (file)(F) 22.

The functions of auxiliary program(D) 15 are basically similar to those in the first embodiment. The functions of auxiliary program(E) 21 and auxiliary program(F) 22 will be explained later.

In database 16, reference restriction management information 17 and directory-file name conversion table 23 are stored. The reference restriction management information 17 is similar to that provided in the first embodiment. The directory-file name conversion table 23 is used for describing correspondence data (i.e., a conversion pair) between the directory-file name including a character sequence specific to a client or user and the original directory-file name.

Figure 8:
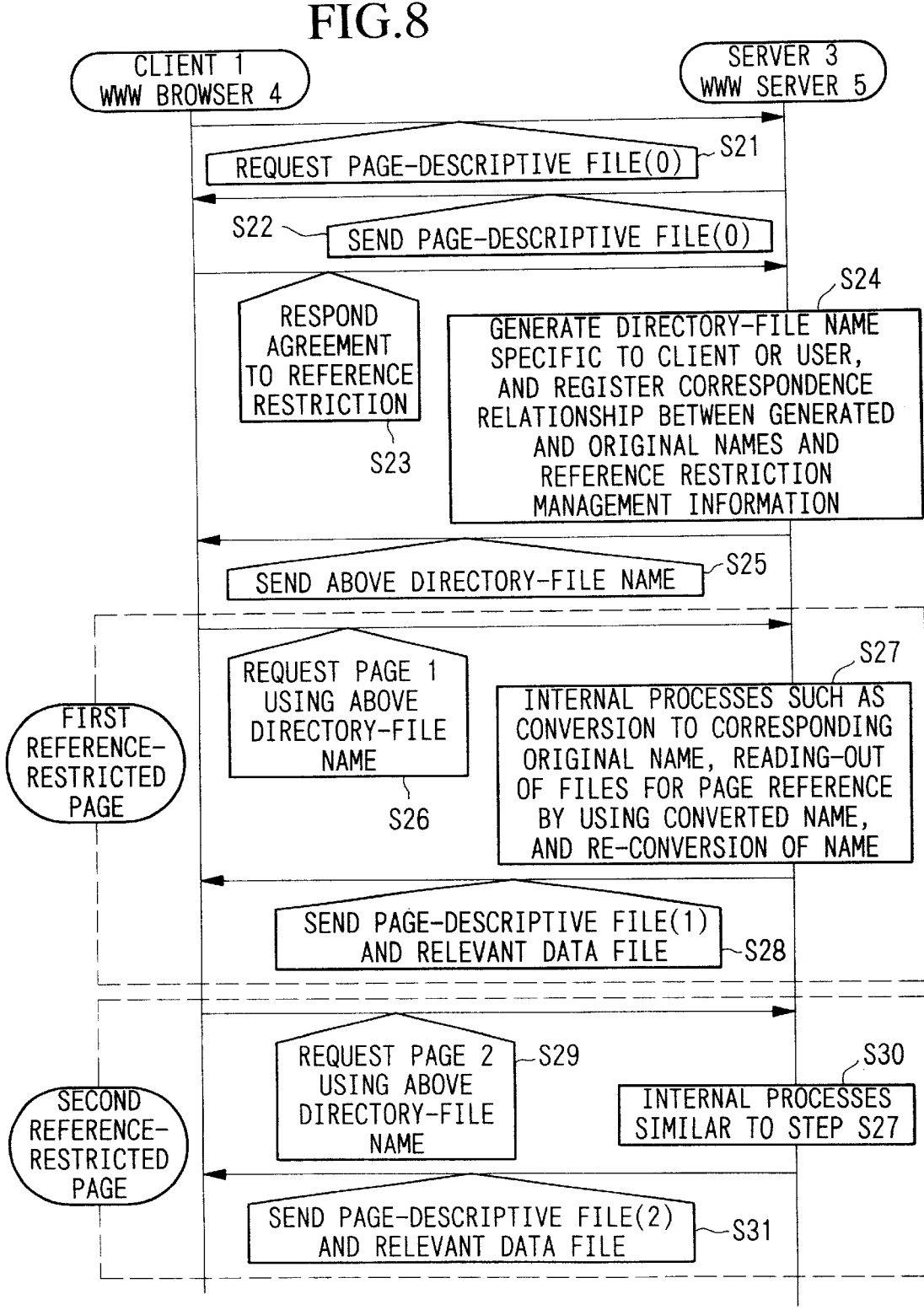
FIG. 8 shows a general processing sequence of the client-server system of FIG. 7.

FIG. 8 shows a general processing sequence of the client-server system of FIG. 7, and general operations of the system will be explained with reference to FIG. 8.

First, a user of client 1 makes a connection to WWW server 5 in server 3 via wide area computer network 2 by using WWW browser 4, and acquires page-descriptive file(0) 6 and the relevant page is displayed (see steps S21 and S22).

Here, as in the first embodiment, a confirmation button for inputting the user's decision whether the user will receive a service for acquiring pages under reference restriction is provided in the page-descriptive file(0) 6, and the user returns a response indicating agreement to the reference restriction to server 3, by clicking the confirmation button on displayed page "0" (see step S23).

When a response of agreement to the reference restriction is sent from client 1, auxiliary program(E) 21 in server 3 is started.

Auxiliary program(E) 21 generates a directory-file name specific to a client or a user, and registers data, which indicate a correspondence relationship (or a conversion pair) between the directory-file name specific to the client or user and the directory-file name of the relevant original file, in directory-file name conversion table 23 of database 16. The program(E) also registers reference restriction management information 17 (of a character sequence specific to the client or user included in the directory-file name, reference restriction start and finish times (or possible reference times)) in database 16 (see step S24). After these operations, the program(E) sends client 1 the directory-file name specific to the client or user (see step S25).

When a user of client 1 sends server 3 via WWW browser 4 a page-acquirement request for page-descriptive file(1) and relevant data file 7 (i.e., page 1) by using the directory-file name specific to the client or user (see step S26), auxiliary program(F) 22 refers to directory-file name conversion table 23 of database 16. If it is found that the directory-file name specific to the client or user has been registered in the database, auxiliary program(F) converts the name to the original directory-file name and informs WWW server 5 of the original name after conversion. The WWW server 5 reads out page-descriptive file(1) and relevant data file 7 using this original directory-file name without considering the directory-file name specific to the client or user (see step S27).

Before sending the read-out files to WWW browser 4 of client 1, auxiliary program(F) 22 again refers to directory-file name conversion table 23 of database 16, and reconverts the original directory-file name to the directory-file name specific to the client or user so as to send page-descriptive file(1) and relevant data file 7 (i.e., page 1) to WWW browser 4.

Hereafter, at the time of turning pages to the second, third, and fourth pages, similar operations are performed by auxiliary program(F) (see steps S26–S31).

On the other hand, auxiliary program(D) 15 of server 3 periodically searches reference restriction management information 17 registered in database 16, and if any exceeding reference time (or reference times) data is found, the program(D) deletes the relevant conversation pair (in directory-file name conversion table 23) of the directory-file names using the character sequence specific to the client or user, with respect to the relevant reference restriction management information. According to these operations, even if the user of client 1 sends a page-acquirement request using the directory-file name specific to the client or user, the requested page cannot be referred to by the user. The operations of auxiliary program(D) 15 are basically similar to those in the first embodiment; thus, a flowchart of the program in the present embodiment will be omitted here.

Figure 9:
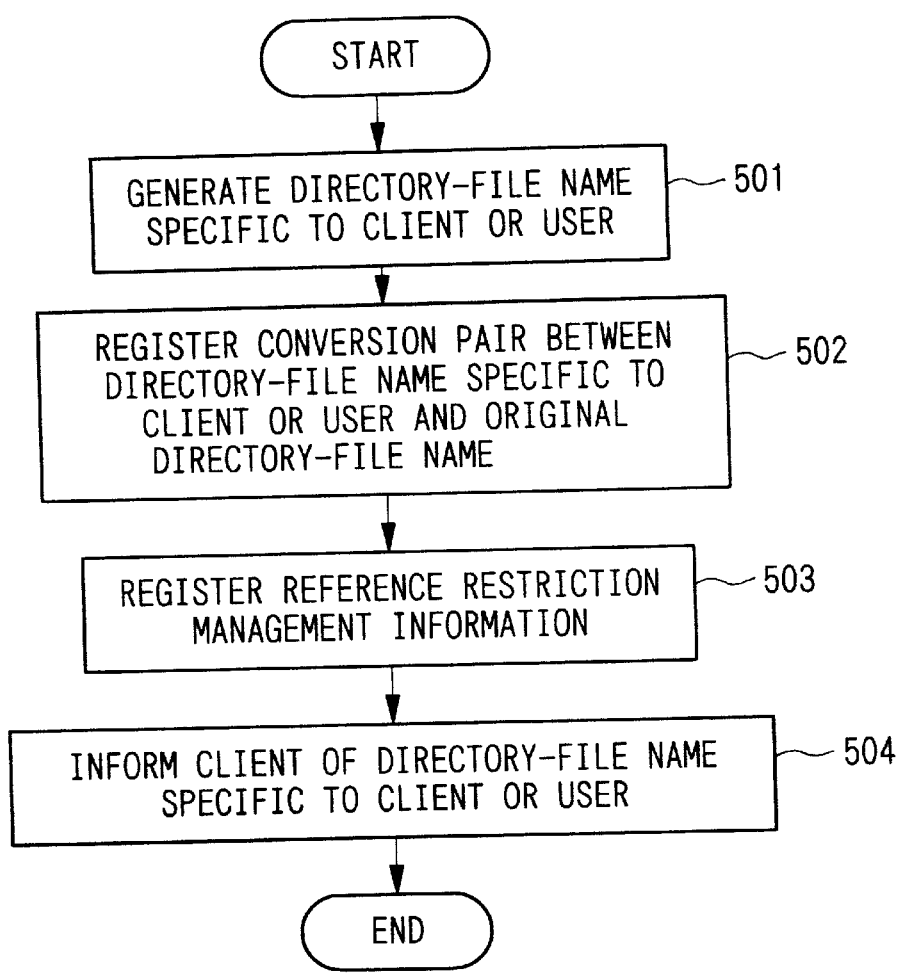
FIG. 9 is a flowchart of auxiliary program(E) shown in FIG. 7.

FIG. 9 shows a flowchart of auxiliary program(E) 21. This program is started when a user of client 1 clicks a confirmation button on the displayed screen of page-descriptive file(0) 6 (i.e., page 0).

The auxiliary program(E) 21 first generates a directory-file name using a character sequence (or a password, a random number, etc.) specific to the client or user (see step 501). The program(E) 21 then registers correspondence data (a conversion pair) of the directory-file name specific to the client or user and relevant original directory-file name in directory-file name conversion table 23 of database 16 (see step 502). The auxiliary program(E) further generates and registers reference restriction management information 17 composed of reference restriction start and finish times (or possible reference times) in database 16 with the character sequence specific to the client or user as an ID (see step 503). Finally, the program(E) informs client 1 of the generated directory-file name specific to the client or user (see step 504). The operations according to auxiliary program(E) 21 are then completed.

Figure 10:
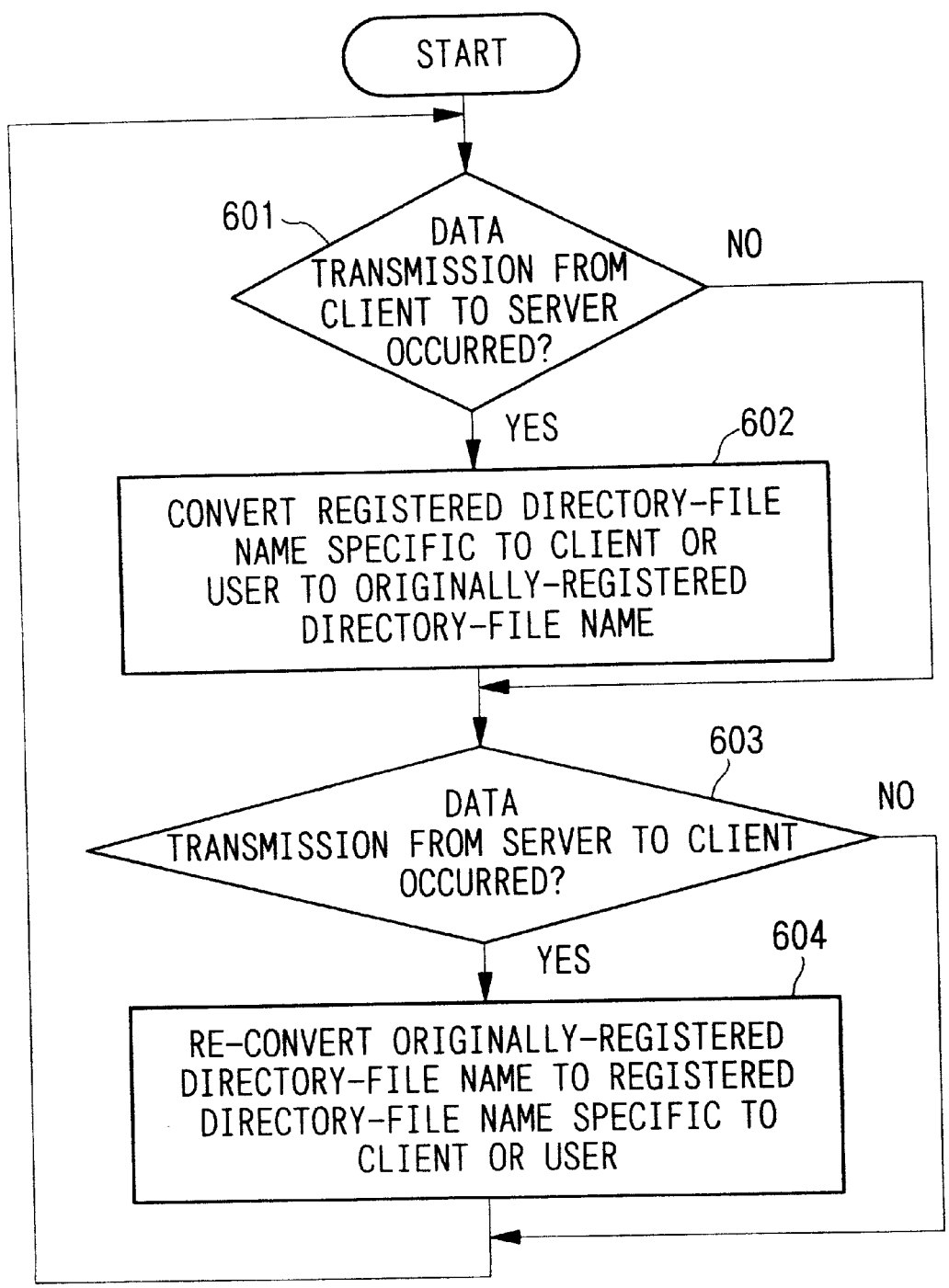
FIG. 10 is a flowchart of auxiliary program(F) shown in FIG. 7.

FIG. 10 shows a flowchart of auxiliary program(F) 22.

The auxiliary program(F) 22 monitors both occurrences of data transmission from the client to the server and data transmission from the server to the client (see steps 601 and 603).

When data transmission from the client to the server occurs, the program(F) refers to directory-file name conversion table 23 in database 16 and converts the relevant directory-file name specific to the client or user to the original directory-file name (see step 602). When data transmission from the server to the client via WWW server 5 occurs after the above operations, the program(F) reconverts the relevant original directory-file name to the directory-file name specific to the client or user by again referring to directory-file name conversion table 23 of database 16 so as to send the client the reconverted data (see step 604).

Hereinbelow, a specific example of the operations of the present embodiment will be shown with reference to lists.

The following list 15 indicates original contents (of files 7–10 in FIG. 7), while the following list 16 shows the content of "page1.html".

LIST 15

| | |
|---|---|
| /html/page1.html | (descriptive file of page 1) |
| /html/picture1a.gif | (relevant data file of page 1) |
| /html/picture1b.gif | (relevant data file of page 1) |
| /html/page2.html | (descriptive file of page 2) |
| /html/picture2a.gif | (relevant data file of page 2) |
| /html/picture2b.gif | (relevant data file of page 2) |
| /html/page3.html | (descriptive file of page 3) |
| /html/picture3a.gif | (relevant data file of page 3) |
| /html/picture3b.gif | (relevant data file of page 3) |
| /html/page4.html | (descriptive file of page 4) |

LIST 16

\<HTML\>
\<HEAD\>page 1\</HEAD\>
\<BODY\>
\<IMG SRC="http://www.a.co.jp/html/picture1a.gif"\>
\<IMG SRC="http://www.a.co.jp/html/picture1b.gif"\>
\<A HREF="http://www.a.co.jp/html/page2.html"\>next page\</A\>
\</BODY\>
\</HTML\>

Similarly, the following list 17 shows the content of "page2.html", while the following list 18 shows the content of "page3.html".

LIST 17

\<HTML\>
\<HEAD\>page 2\</HEAD\>
\<BODY\>
\<IMG SRC="http://www.a.co.jp/html/picture2a.gif"\>
\<IMG SRC="http://www.a.co.jp/html/picture2b.gif"\>
\<A HREF="http://www.a.co.jp/html/page3.html"\>next page\</A\>
\</BODY\>
\</HTML\>

LIST 18

\<HTML\>
\<HEAD\>page 3\</HEAD\>
\<BODY\>
\<IMG SRC="http://www.a.co.jp/html/picture3a.gif"\>
\<IMG SRC="http://www.a.co.jp/html/picture3b.gif"\>
\<A HREF="http://www.a.co.jp/html/page4.html"\>next page\</A\>
\</BODY\>
\</HTML\>

In this example, the domain name of the WWW server (which is an identifier for specifying the WWW server in a wide area computer network) is also assumed to be "www.a.co.jp".

The following list 19 shows an example of reference restriction control information 18, in which it is defined that "10 minutes" are assigned to files in directory "html" as the possible reference time.

LIST 19

| \<Directory name where file for reference restriction exists\> | \<Possible reference time\> |
|---|---|
| html | 10 |

When auxiliary program(E) 21 is started via the WWW browser, directory name "12345678" using the character sequence specific to the client or user is generated, and a conversion pair of character sequence "12345678" specific to the client or user and original name "html" is registered as shown in the following list 20.

LIST 20

| \<Specific character sequence\> | \<Original directory name\> |
|---|---|
| 12345678 | html |

Then, the name of page-descriptive file "/12345678/page1.html" for reference restriction is communicated to the WWW browser.

As "10 minutes" have been defined as the possible reference time limit in the above list 19, if temporal reference restriction is preferably performed, data in the following list 21 are registered as reference restriction management information 17.

LIST 21

| \<Specific character sequence\> | \<Reference restriction start time\> | \<Reference restriction finish time\> |
|---|---|---|
| 12345678 | 1998/02/19 20:31:43 | 1998/02/19 20:41:43 |

The auxiliary program(D) 15 in server 3 periodically compares the reference restriction finish time and the present time. If the present time exceeds the reference restriction finish time, the following correspondence data:

are deleted from the directory-file name conversion table (refer to the above list 20).

When a request for acquiring "http://www.a.cojp/12345678/page1.html" is sent via the WWW browser, this request is converted to a request such as "http://www.a.co.jp/html/page1.html" by auxiliary program(F) 22 of the server and the converted request is sent to the WWW server. The WWW server which received the acquirement request outputs the HTML (as it is) as shown in list 16. These output data are further converted by auxiliary program(F) 22 of the server, and the HTML as shown in the following list 22 is sent to the WWW browser.

---
LIST 22
---

```
<HTML>
<HEAD>page 1</HEAD>
<BODY>
<IMG SRC="http://www.a.co.jp/12345678/picture1a.gif">
<IMG SRC="http://www.a.co.jp/12345678/picture1b.gif">
<A HREF="http://www.a.co.jp/12345678/page2.html">next page</A>
</BODY>
</HTML>
```

When button "next page" is clicked on the screen displayed by the WWW browser, a request for acquiring "http://www.a.cojp/12345678/page2.html" is sent from the client to the server. This request is converted to a request for "http://www.a.co.jp/html/page2.html" by auxiliary program (F) 22 of the server and the converted request is sent to the WWW server. The WWW server which received the request outputs the HTML (as it is) as shown in list 17. The output HTML is further converted by auxiliary program(F) 22 of the server and the HTML as shown in the following list 23 is sent to the WWW browser.

---
LIST 23
---

```
<HTML>
<HEAD>page 2</HEAD>
<BODY>
<IMG SRC="http://www.a.co.jp/12345678/picture2a.gif">
<IMG SRC="http://www.a.co.jp/12345678/picture2b.gif">
<A HREF="http://www.a.co.jp/12345678/page3.html">next page</A>
</BODY>
</HTML>
```

When the button "next page" is again clicked via the WWW browser, a request for acquiring "http://www.a.cojp/12345678/page3.html" is sent from the client to the server. This request is converted to a request for "http://www.a.co.jp/htmVpage3.html" by auxiliary program(F) 22 of the server and the converted request is sent to the WWW server. The WWW server which received the request outputs the HTML (as it is) as shown in list 18. The output HTML is further converted by auxiliary program(F) 22 of the server and the HTML as shown in the following list 24 is sent to the WWW browser.

---
LIST 24
---

```
<HTML>
<HEAD>page 3</HEAD>
```

---
LIST 24 -continued
---

```
<BODY>
<IMG SRC="http://www.a.co.jp/12345678/picture3a.gif">
<IMG SRC="http://www.a.co.jp/12345678/picture3b.gif">
<A HREF="http://www.a.co.jp/12345678/page4.html">next page</A>
</BODY>
</HTML>
```

Third Embodiment

Figure 11:
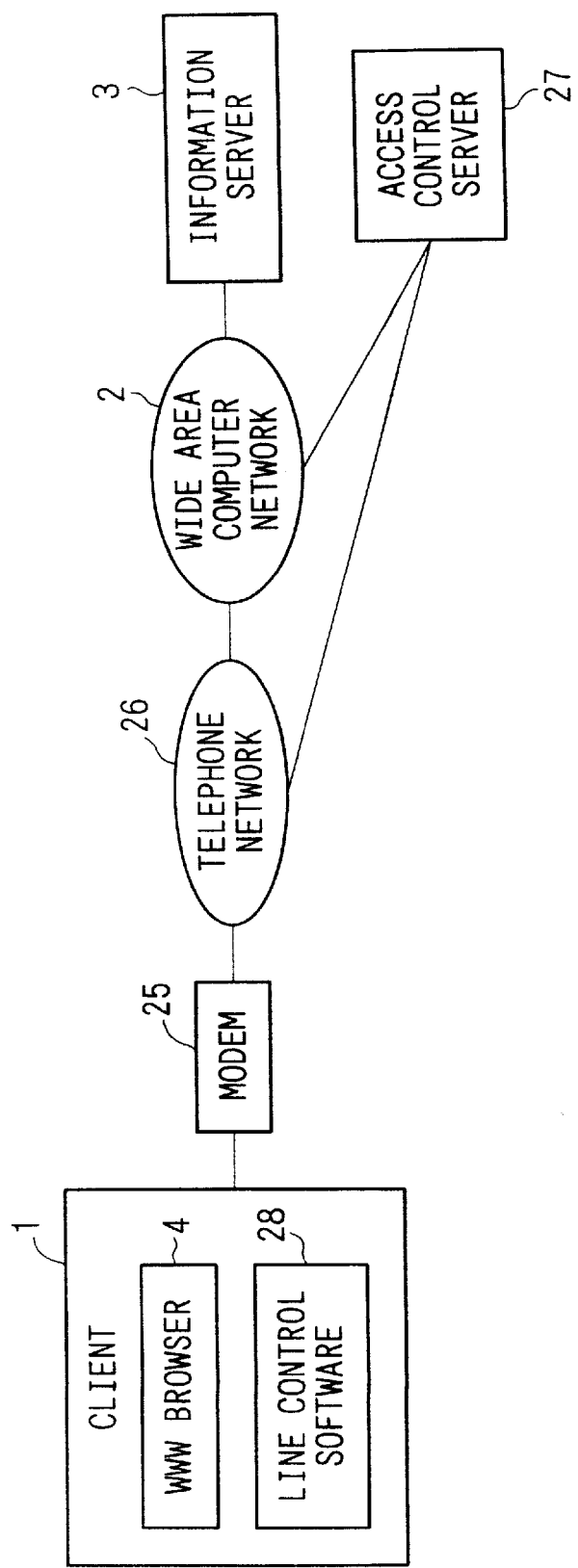
FIG. 11 is a diagram showing construction of a client-server system as the third embodiment of the present invention.

FIG. 11 is a diagram showing construction of a client-server system as the third embodiment of the present invention. This embodiment enables collection of information charges which is linked to collection of telephone tolls.

This client-server system is composed of client 1, wide area computer network 2, information server 3, modem 25, telephone network 26, and access control server 27.

Figure 12:
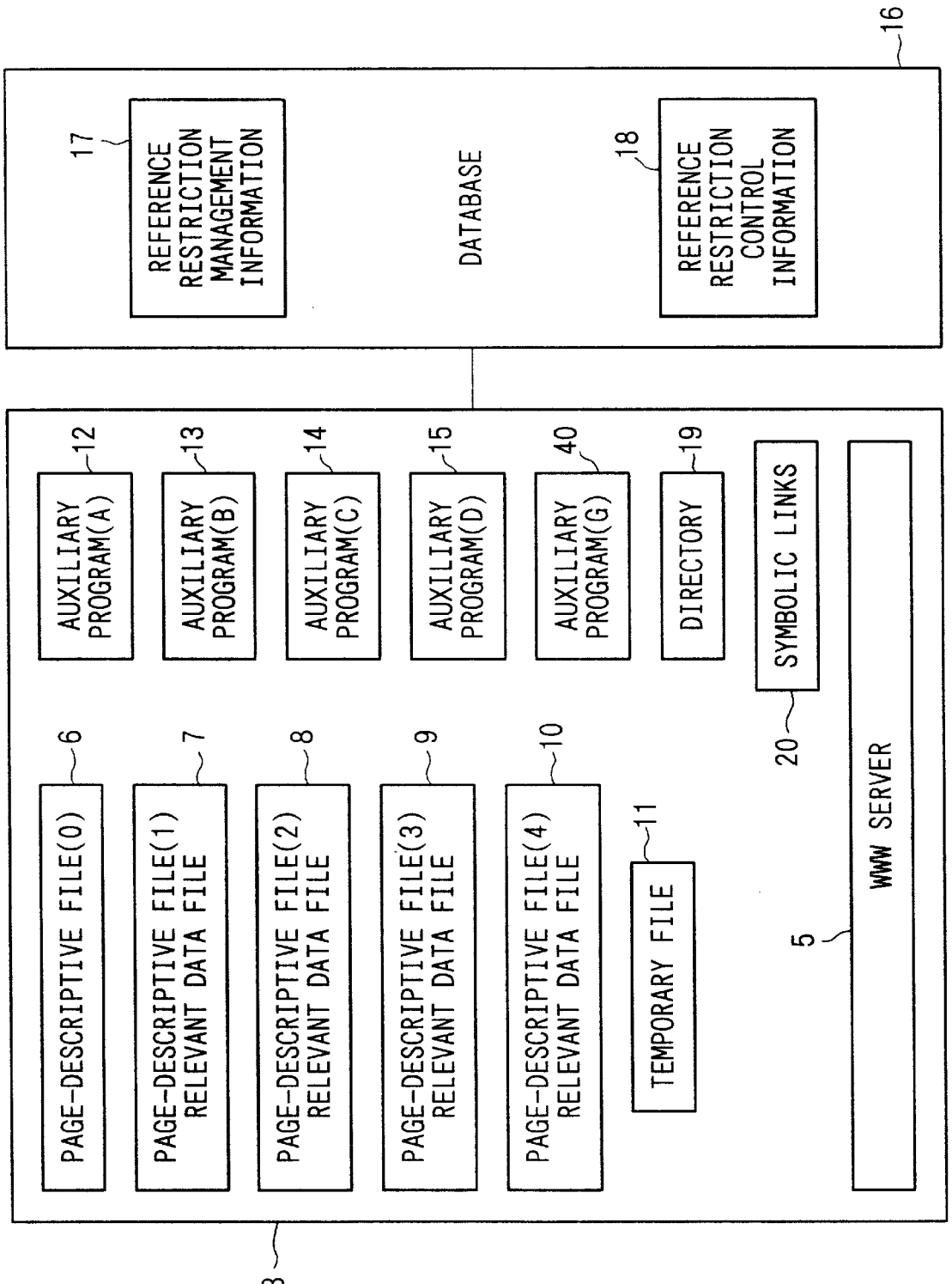
FIG. 12 shows an example of the internal structure of information server 3 of the client-server system shown in FIG. 11.

In the present embodiment, client 1 comprises WWW browser 4 and line control software 28. Here, information server 3 has functions similar to those of server 3 in the first embodiment, and has the internal structure as shown in FIG. 12. That is, elements in the internal structure are the same as the first embodiment except for auxiliary program (file)(G) 40 which is added here. The access control server 27 controls substitution of collecting information charges. The server 27 stores information relating to the kinds of possible data for the charge-collecting substitution performed via this server (that is, possible data which can be provided by the information server 3) and telephone numbers assigned for each data (the same number may be assigned for plural data). The access control server 27 can be connected to client 1 using each assigned telephone number.

Figure 13:
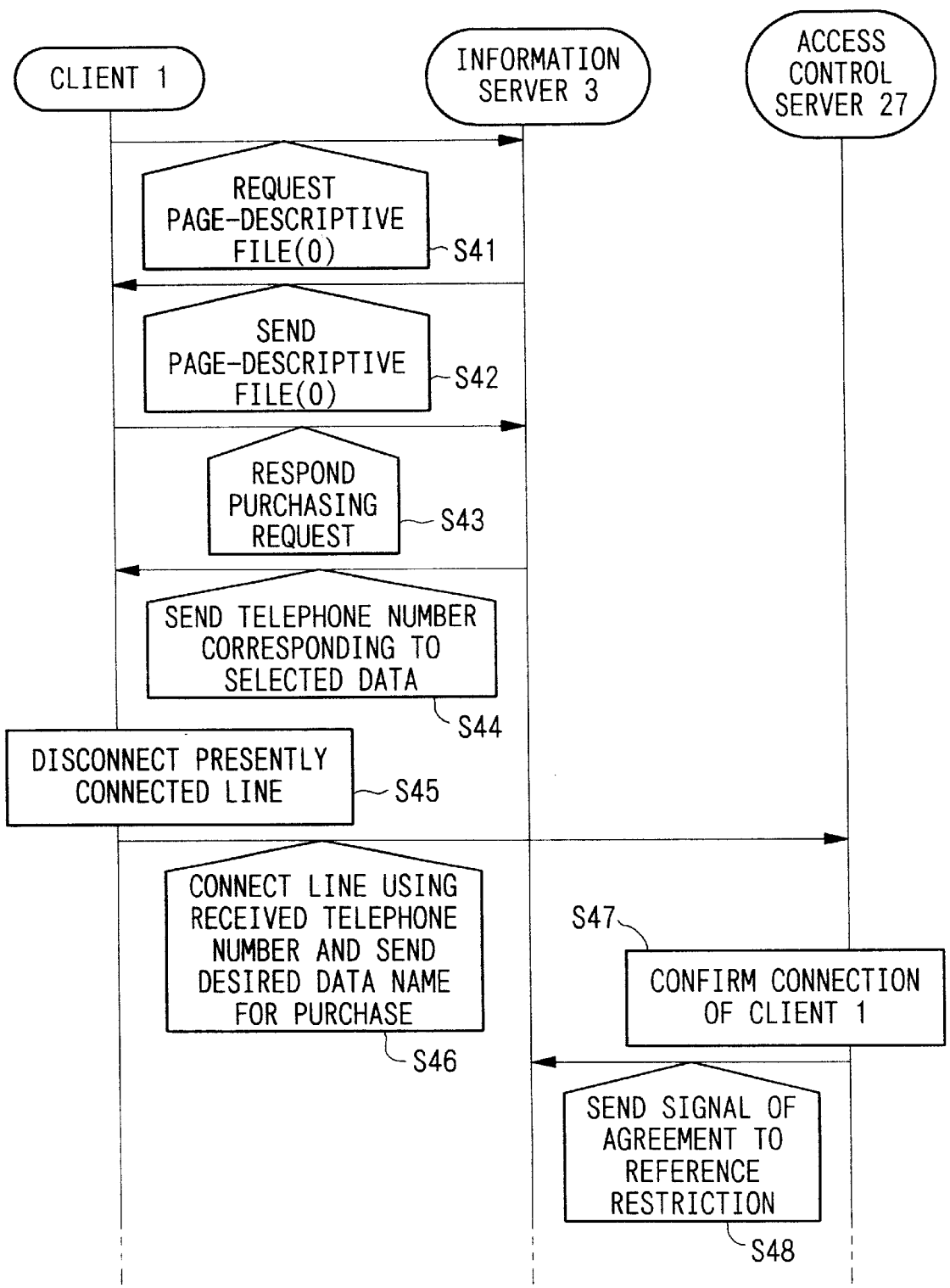
FIG. 13 shows a part of a general processing sequence of the client-server system of FIG. 11.

FIG. 13 shows an initial sequence of the client-server system of FIG. 11, and operations of this system will be explained with reference to FIG. 13.

First, client 1 makes connection to wide area computer network 2 via modem 25 and telephone network 26, and acquires page-descriptive file(0) 6 from WWW server 5 and the relevant page is displayed by using WWW browser 4 of the client (see steps S41 and S42). In the page-descriptive file(0) 6 (i.e., page "0"), a list of data which can be obtained from WWW server 5 and a button for purchasing data are have been prepared. The user selects data, which the user would like to purchase, from among data displayed in page 0, and returns a response indicating a purchasing request to WWW server 5 by clicking the purchasing button (see step S43).

When a response of purchasing request is sent from client 1, auxiliary program(G) 40 is started. The auxiliary program (G) 40 sends a telephone number corresponding to the data selected by client 1 to this client (see step S44). Here, this telephone number was assigned to the data based on a contract with a telephone company so as to act as an intermediary to collect information charges. As a specific example, a number belonging to "dial $Q^2$" network (used in Japan) or the like may be used.

The client 1, which received the above telephone number via line control software 28, disconnects the present call which has been connected to the wide area computer network 2 via modem 25 and telephone network 26 (see step S45). The client then sends a call using the above telephone number and establishes a dial-up connection via modem 25 and telephone network 26 to access control server 27 so as to send a name of data which the client requests to purchase (see step S46).

When access control server 27 confirms that client 1 has established connection with a line of the telephone number corresponding to the data which the client requested to purchase (see step S47), the server 27 sends auxiliary program(A) 12 of information server 3 a signal indicating agreement to reference restriction (see step S48). Accordingly, auxiliary program(A) 12 is started and operations from step 4 in FIG. 2 are performed.

Figure 14:
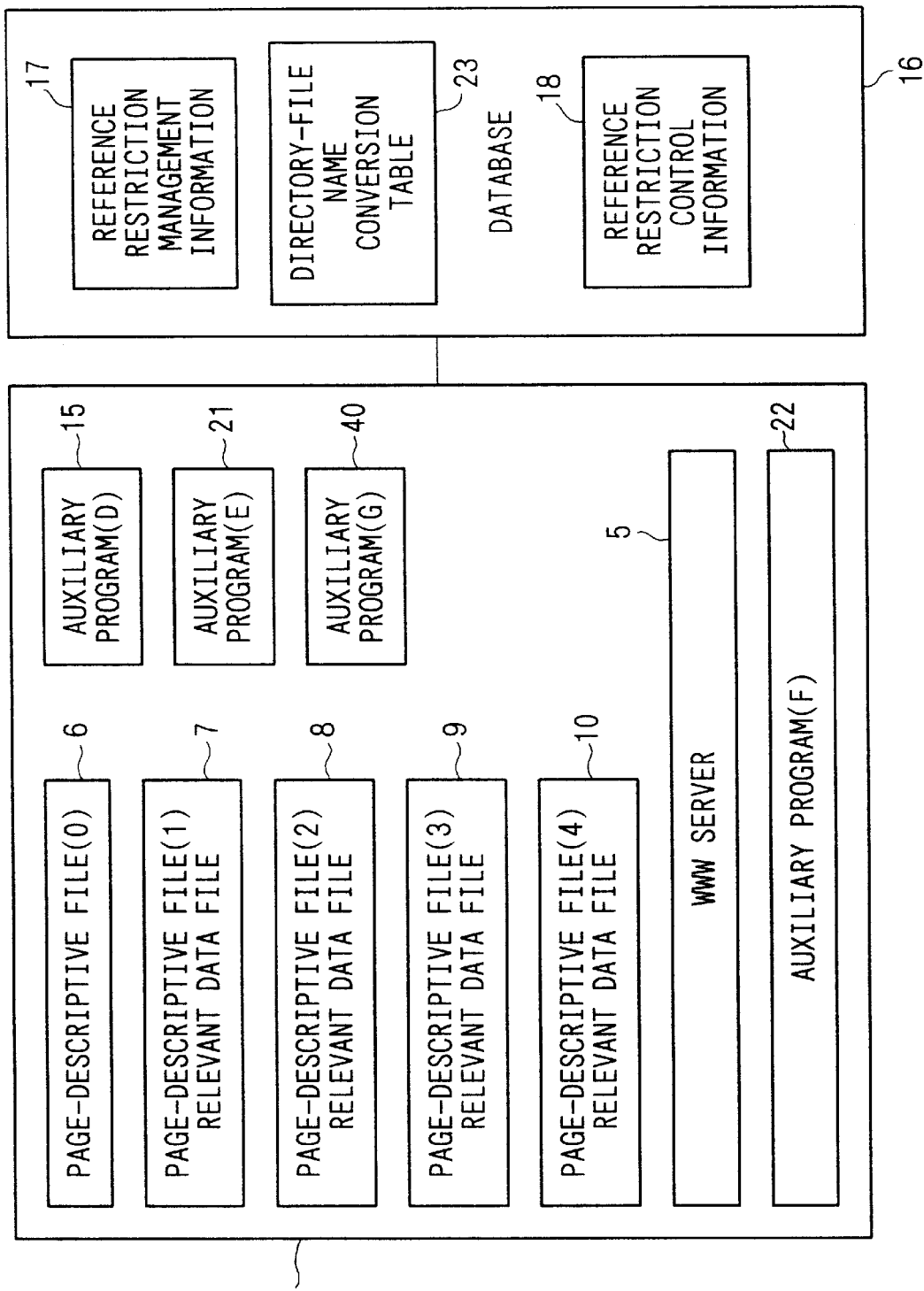
FIG. 14 shows another example of the internal structure of information server 3 of the client-server system shown in FIG. 11.

Information server 3 may have a structure similar to that of server 3 shown in FIG. 7 of the second embodiment. FIG. 14 shows the structure of this case. Operations performed in this case are also similar except that the signal sent from access control server 27 to information server 3 in step 48, which indicates agreement to reference restriction, is sent to auxiliary program(E) 21.

In the present embodiment, a page for selecting data to be purchased is not restricted for any client or user, but only a client or a user who finished necessary procedures for payment of charges can obtain and look up data of the WWW server by using the WWW browser. Line-connecting conditions of the client are detected by the access control server; thus, it is possible to establish a toll system in consideration of data charges and to collect such information charges included in telephone tolls.

Fourth Embodiment

Figure 15:
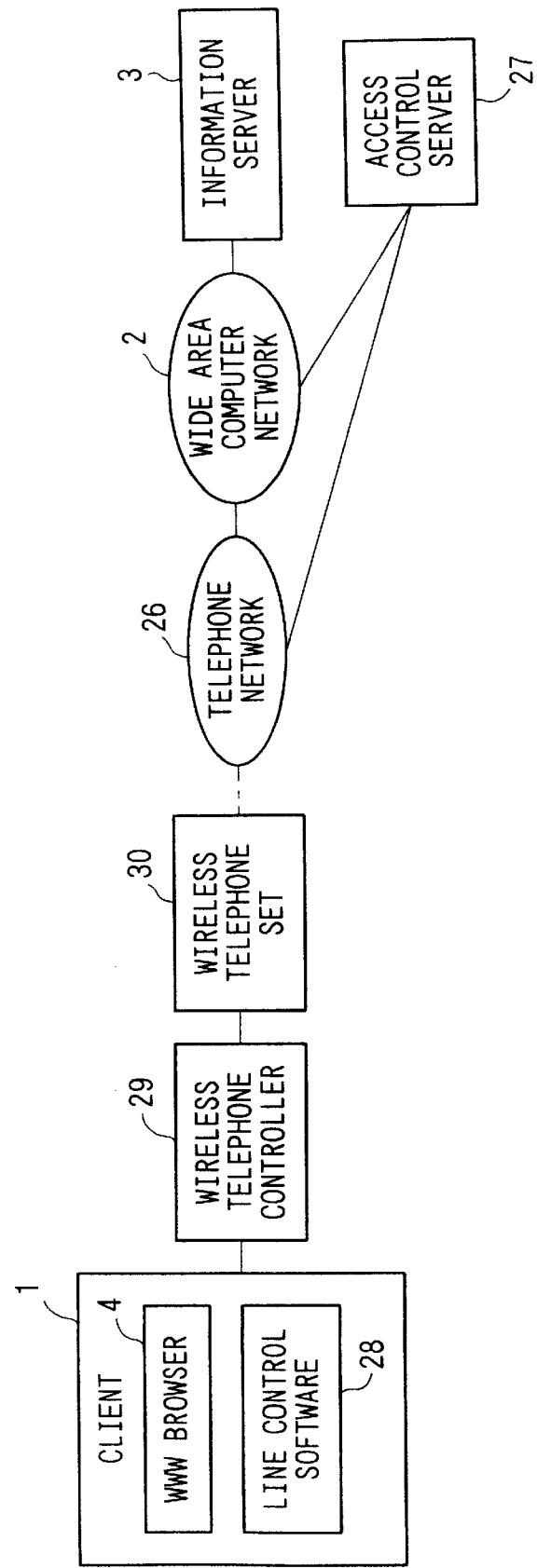
FIG. 15 is a diagram showing construction of a client-server system as the fourth embodiment of the present invention.

FIG. 15 is a diagram showing construction of a client-server system as the fourth embodiment of the present invention, which uses a wireless telephone.

This client-server system is composed of client 1, wide area computer network 2, information server 3, wireless telephone controller 29, wireless telephone set 30, modem 25, telephone network 26, and access control server 27. Structural difference from the system configuration shown in FIG. 11 as the third embodiment is that client 1 wirelessly connects to telephone network 26 via wireless telephone controller 29 and wireless telephone set 30.

If operations similar to those of the third embodiment are performed in the present embodiment, client 1 first wirelessly connects to telephone network 26 via wireless telephone controller 29 and wireless telephone set 30, and further connects to information server 3 via wide area computer network 2. Then, page-descriptive file(0) 6 in WWW server 5 of information server 3 is acquired and displayed by using WWW browser 4 of client 1.

The transmission of the telephone number from information server 3 in step S44 in FIG. 13 is also wirelessly performed. The client 1 which received a telephone number disconnects the call on the wireless connection line with telephone network 26 via wireless telephone controller 29 and wireless telephone set 30. The client then wirelessly sends a new call according to the telephone number received by using the line control software 28, and establishes a dial-up connection to access control server 27 via modem 25 and telephone network 26. After the connection is established, client 1 sends the access control server a name of data which the client requests to purchase.

System operations are similar to those of the third embodiment.

The preferred embodiments according to the present invention are explained above. The processing programs of each server (each auxiliary program, etc.) as shown in FIGS. 1, 7, and 11 can be stored, as programs for restricting reference of data of a WWW server via a WWW browser in the client-server system, into a storage medium such as an FD or CD-ROM in a computer-readable form for marketing. If the programs stored in such a storage medium are set up in each suitable server, functions of restricting data reference for each client or user as shown in the above embodiments are realized.

What is claimed is:

1. A method of restricting a predetermined user unit to refer to data stored in a WWW server using a WWW browser in a client-server system connected to a wide area computer network, wherein:

when the WWW browser at the client side demands to refer to a page-descriptive file and a relevant data file of a predetermined page of the server side, the service side generates new files which respectively have the same substantial contents as the above two files while directory-file names of character sequences for specifying each of the new files are respectively different from those of the above files to be referred to, each new file name including a character sequence specific to the user unit, and the server side informs the client side of the character sequence specific to the user unit, and the server side informs the client side of the character sequence specific to the user unit; and when the WWW browser sends the server side a request for acquiring the page-descriptive file and relevant data file by using the character sequence specific to the user unit, the server side verifies the character sequence specific to the user unit, appended to the request, and only when the verified character sequence is true, the server side sends the WWW browser the page-descriptive file and relevant data file which have been revised in content by which the WWW browser refers to the files having different names.

2. A method as claimed in claim 1, wherein the user unit is a client.

3. A method as claimed in claim 1, wherein the user unit is a user who accesses the computer network via the client.

4. A method as claimed in claim 1, wherein the server side allows the user unit to refer to the data of the WWW server only when the server side confirms that the character sequence specific to the user unit, sent from the client side, is proper.

5. A method as claimed in claim 1, wherein when the WWW browser sends the server side a request for acquiring a page-descriptive file and a relevant data file of a page different from the predetermined page, the server sides converts a description necessary for page-turning to the requested page to a description using the character sequence specific to the user unit and a page name of the requested page, and sends the page-descriptive file and relevant data file including the converted content from the WWW server to the WWW browser, by which reference restriction using the character sequence specific to the user unit is performed over plural pages.

6. A method as claimed in claim 1, wherein the files having different names are generated as symbolic links indicating the substantial contents of the page-descriptive file and relevant data file of the relevant page, and have no substantial content.

7. A method as claimed in claim 1, wherein the server side monitors a data reference time or reference times of the user unit, and if the reference time or times exceed a predetermined time or number, the server side deletes the files having the different names specific to the user unit so that the user unit cannot refer to data hereafter.

8. A method of restricting a predetermined user unit to refer to data stored in a WWW server using a WWW browser in a client-server system connected to a wide area computer network, wherein:

when the WWW browser at the client side demands to refer to a page-descriptive file and a relevant data file of a predetermined page of the server side, the server side generates a directory-file name specific to the user unit and registers data of a conversion pair of the directory-file name specific to the user unit and an original directory-file name relating to corresponding original files of the system, and informs the client side the directory-file name specific to the user unit;

when the WWW browser sends the server side a request for acquiring the page-descriptive file and relevant data file using the directory-file name specific to the user unit, the server side refers to the conversion pair and converts the directory-file name specific to the user unit to the original directory-file name, and informs the WWW server at the server side of the converted name, the WWW server reads out the page-descriptive file and relevant data file according to the original directory-file name; and the server side reconverts the original directory-file name to the directory-file name specific to the user unit, and sends the WWW browser the read-out page-descriptive file and relevant data file.

9. A method as claimed in claim 8, wherein the user unit is a client.

10. A method as claimed in claim 8, wherein the user unit is a user who accesses the computer network via the client.

11. A method as claimed in claim 8, wherein the server side allows the user unit to refer to the data of the WWW server only when the server side confirms that the directory-file name specific to the user unit, sent from the client side, is proper.

12. A method as claimed in claim 8, wherein the server side monitors a data reference time or reference times of the user unit, and if the reference time or times exceed a predetermined time or number, the server side deletes the data of the conversion pair of the directory-file name specific to the user unit and the original directory-file name so that the user unit cannot refer to data hereafter.

13. A method of restricting data reference in a client-server system connected to a wide area computer network so as to collect charges, which are predetermined for each data provided from a WWW server, with telephone tolls, wherein:

an information-providing server informs a client, which has connected to the wide area computer network via a predetermined telephone line, of a list of possible data provided by the WWW server at the information-providing server side;

when the client side selects desired data from the communicated data list and informs the information-providing server side of the selected data, the information-providing server side informs the client side of a telephone number which has been assigned for the relevant data and is used for substitutingly performing information-charge collection;

the client side then disconnects the predetermined telephone line and sends a call using the telephone number received from the information-providing server side and establishes a dial-up connection with an access control server to which the client can be connected using the above telephone number, and client side informs the access control server a name of the desired data; and when the access control server confirms that the client side has established connection using the telephone number assigned for the relevant data, the control server informs the information-providing server of agreement to data reference, by which the information-providing server sends the client side the relevant data.

14. A method as claimed in claim 13, wherein for each data which can be provided by the WWW server, a telephone number which enables connection to the access control server is assigned.

15. A method as claimed in claim 13, wherein the client side accesses a desired line by using a wireless telephone set.

16. A storage medium storing a computer-executable processing program of a server side for restricting a predetermined user unit to refer to data stored in a WWW server using a WWW browser in a client-server system connected to a wide area computer network, the program comprising the processes of:

generating new files when the WWW browser at the client side demands to refer to a page-descriptive file and a relevant data file of a predetermined page of the server side, the new files respectively having the same substantial contents as the above two files while directory-file names of character sequences for specifying each of the new files being respectively different from those of the above files to be referred to, each new file name including a character sequence specific to the user unit; and informing the client side of the character sequence specific to the user unit; and sending the WWW browser the page-descriptive file and relevant data file which have been revised in content by which the WWW browser refers to the files having different names when receiving a request for acquiring the page-descriptive file and relevant data file using the character sequence specific to the user unit from the WWW browser.

17. A storage medium as claimed as claim 16, wherein the program further comprises the process of monitoring a data reference time or reference times of the user unit and deleting the files having the different names specific to the user unit if the reference time or times exceed a predetermined time or number.

18. A storage medium storing a computer-executable processing program of a server side for restricting a predetermined user unit to refer to data stored in a WWW server using a WWW browser in a client-server system connected to a wide area computer network, the program comprising the processes of:

generating a directory-file name specific to the user unit when the WWW browser at the client side demands to refer to a page-descriptive file and a relevant data file of a predetermined page of the server side; registering data of a conversion pair of the directory-file name specific to the user unit and an original directory-file name relating to corresponding original files of the system; and informing the client side of the directory-file name specific to the user unit; and referring to the conversion pair when receiving a request for acquiring the page-descriptive file and relevant data file using the directory-file name specific to the user unit; converting the directory-file name specific to the user unit to the original directory-file name; and informing the WWW server at the server side of the converted name; and reconverting the original directory-file name to the directory-file name specific to the user unit, and sending the WWW browser the page-descriptive file and relevant data file read-out by the WWW server.

19. A storage medium as claimed as claim 18, wherein the program further comprises the process of monitoring a data reference time or reference times of the user unit and deleting the data of the conversion pair of the directory-file name specific to the user unit and the original directory-file name if the reference time or times exceed a predetermined time or number.

20. A storage medium storing a computer-executable processing program of an information providing server side for restricting data reference in a client-server system connected to a wide area computer network so as to collect charges, which are predetermined for each data provided from a WWW server, with telephone tolls, the program comprising the processes of:

informing a client, which has connected to the wide area computer network via a predetermined telephone line, of a list of possible data provided by the WWW server in the present information-providing server;

informing the client side, when receiving information of desired data from the client side, of a telephone number which has been assigned for the relevant data and is used for substitutingly performing information-charge collection; and sending the client side the relevant data when receiving information indicating agreement to data reference from an access control server to which the client side can connect by using the above telephone number.

21. A storage medium storing a computer-executable processing program of an access control server side for making a computer execute the program for restricting data reference in a client-server system connected to a wide area computer network so as to collect charges, which are predetermined for each data provided from a WWW server, with telephone tolls, the program comprising the processes of:

receiving a name of desired data for reference from the client side via a dial-up connection; confirming that the client side has established the connection using a telephone number assigned for the relevant data; and informing an information-providing server, which can provide the relevant data, of agreement to data reference.

* * * * *